United States Patent
Hua et al.

(10) Patent No.: US 8,892,915 B2
(45) Date of Patent: Nov. 18, 2014

(54) METHOD AND APPARATUS OF POWER OVER ETHERNET

(75) Inventors: Rui Hua, Nanjing (CN); Zhangqing He, Nanjing (CN); Ying Gu, Nanjing (CN); Yinggen Wu, Nanjing (CN); Tongqiang Cao, Nanjing (CN); Jianguang Yang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 226 days.

(21) Appl. No.: 13/535,589

(22) Filed: Jun. 28, 2012

(65) Prior Publication Data

US 2013/0103958 A1    Apr. 25, 2013

(30) Foreign Application Priority Data

Oct. 20, 2011    (CN) .......................... 2011 1 0320401

(51) Int. Cl.
| | |
|---|---|
| G06F 1/32 | (2006.01) |
| G06F 1/26 | (2006.01) |
| H04L 12/40 | (2006.01) |
| H04L 12/10 | (2006.01) |
| H04L 12/12 | (2006.01) |
| H04L 12/413 | (2006.01) |

(52) U.S. Cl.
CPC .............. H04L 12/10 (2013.01); G06F 1/266 (2013.01); G06F 1/3209 (2013.01); H04L 12/40045 (2013.01); H04L 12/12 (2013.01); H04L 12/413 (2013.01); H04L 12/40039 (2013.01)
USPC ............................ 713/310; 713/320; 713/323

(58) Field of Classification Search
CPC ............................ G06F 1/3296; G06F 1/3209
USPC ........................................ 713/310, 320, 323
See application file for complete search history.

(56) References Cited

U.S. PATENT DOCUMENTS

| | | | |
|---|---|---|---|
| 2007/0165548 A1 | 7/2007 | Woo et al. | |
| 2007/0288784 A1* | 12/2007 | Koper et al. | 713/324 |
| 2009/0055666 A1* | 2/2009 | Yee | 713/320 |
| 2010/0031070 A1* | 2/2010 | Tomomitsu | 713/300 |
| 2010/0078992 A1* | 4/2010 | Landry et al. | 307/2 |
| 2012/0060042 A1* | 3/2012 | Buhari et al. | 713/320 |

OTHER PUBLICATIONS

Extended European Search Report issued in corresponding European Patent Application No. 12174952.7, mailed Jan. 30, 2013.
Texas Instruments, IEEE 802.3af PoE Powered Device Controllers with Auto-Retry, Mar. 2005. TPS2375-1, XP-002689923.

* cited by examiner

*Primary Examiner* — Vincent Tran
(74) *Attorney, Agent, or Firm* — Brinks Gilson & Lione

(57) ABSTRACT

The present disclosure discloses a method and an apparatus of power over Ethernet, and belongs to the field of communications. An Ethernet power sourcing equipment sets a power supply port to a sleep state, and sets a timer for the power supply port; enables the power supply port when the timer reaches a set time; and detects whether a powered device PD is connected to the power supply port, and if a PD is connected to the power supply port, triggers the power supply port to supply power to the PD; if no PD is connected to the power supply port, resets the power supply port to the sleep state, and sets the timer for the power supply port. Implementation of the present disclosure effectively reduces power consumption of the system and saves energy.

8 Claims, 3 Drawing Sheets

METHOD AND APPARATUS OF POWER OVER ETHERNET

CROSS-REFERENCE TO RELATED APPLICATION

This application claims priority to Chinese Patent Application No. 201110320401.1, filed on Oct. 20, 2011, which is hereby incorporated by reference in its entirety.

FIELD

The present disclosure relates to the field of communications technologies, and in particular, to a method and an apparatus of power over Ethernet.

BACKGROUND

Power over Ethernet (Power Over Ethernet in English, POE for short) is a technology of supplying direct current to IP-based terminals (such as an IP telephone, a wireless local area network access point AP, and a network camera) while transmitting data signals for such terminals without modifying an existing basic cabling structure of the Ethernet. A PoE system includes a power sourcing equipment (Power sourcing equipment in English: PSE for short) and a powered device (Powered device in English, PD for short).

Currently, the PoE technology is applied to people's life more and more widely, an increasingly high proportion of PoE ports are applied in electrical interface switches of the Ethernet, and more and more types of devices are supported by the PoE.

In the working state, the PSE detects whether a PD is connected to a port of the PSE. If it is detected that a PD is connected to a port, the PSE identifies the type of the PD, evaluates the power loss required by the PD, and starts supplying power to the PD. If no PD is connected to the ports of the PSE, all ports of the PSE keep detecting. The continuous detection leads to continuous consumption and waste of power.

SUMMARY

Embodiments of the present disclosure provide a method and an apparatus of power over Ethernet to solve the problem of power waste caused by continuous detection when no PD is connected to a power supply port in the prior art.

In one aspect, an embodiment of the present disclosure provides a method of power over Ethernet, which includes: setting a power supply port to a sleep state, and setting a timer for the power supply port; enabling the power supply port when the timer reaches a set time; and detecting whether a powered device (PD) is connected to the power supply port, and if a PD is connected to the power supply port, triggering the power supply port to supply power to the PD; if no PD is connected to the power supply port, setting the power supply port to the sleep state, and setting the timer for the power supply port again.

In another aspect, an embodiment of the present disclosure provides an apparatus of power over Ethernet, which includes a controller, a power supply port, and a timer. The controller is configured to: set the power supply port to a sleep state, and set the timer for the power supply port; enable the power supply port when the timer reaches a set time; and detect whether a powered device (PD) is connected to the power supply port, and if a PD is connected to the power supply port, trigger the power supply port to supply power to the PD; if no PD is connected to the power supply port, set the power supply port to the sleep state, and set the timer for the power supply port again. The power supply port is configured to supply power to the PD in an enabled state. The timer is configured to time the sleep state of the power supply port.

In the embodiments of the present disclosure, the power supply port gets into a sleep state when idle, and gets into an enabled state and supplies power to a PD when the PD is connected to the power supply port, which effectively reduces power consumption of the system and saves energy. Meanwhile, the detection is performed in steps, which prevents interference caused by incorrect line connections from being mistakenly regarded as connecting a PD to the power supply port, and improves precision of PD detection.

BRIEF DESCRIPTION OF THE DRAWINGS

To illustrate the technical solutions in the embodiments of the present disclosure or in the prior art more clearly, the accompanying drawings required for describing the embodiments or the prior art are introduced in the following briefly. Apparently, the accompanying drawings in the following descriptions merely show some of the embodiments of the present disclosure, and persons of ordinary skill in the art can obtain other drawings according to the accompanying drawings without creative efforts.

DETAILED DESCRIPTION OF THE EMBODIMENTS

To make the objectives, technical solutions and advantages of the present disclosure more comprehensible, the following describes the technical solutions in the embodiments of the present disclosure clearly and completely with reference to accompanying drawings. Evidently, the embodiments to be described are only a part rather than all of the embodiments of the present disclosure. All other embodiments, which can be derived by persons of ordinary skill in the art from the embodiments of the present disclosure without any creative effort, shall fall within the protection scope of the present disclosure.

Figure 1:
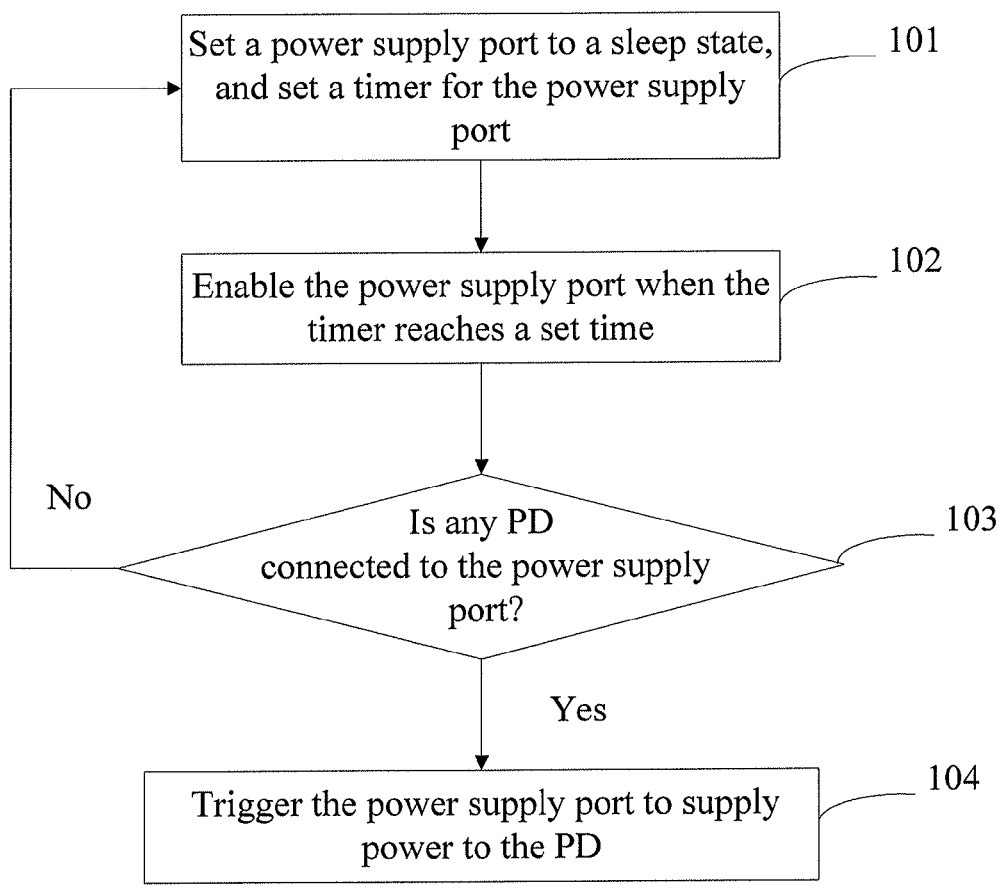
FIG. 1 is a schematic flowchart of a method of power over Ethernet according to an embodiment of the present disclosure.

FIG. 1 is a schematic flowchart of a method of power over Ethernet according to an embodiment of the present disclosure. The method includes the following steps.

101: Set a power supply port to a sleep state, and set a timer for the power supply port.

At the time of powering on a PSE, set all ports of the PSE to the sleep state, and set a timer for each port. In the sleep state, each port of the PSE is off, outputs no voltage, and consumes no power.

102: Enable the power supply port when the timer reaches a set time.

A control system on the PSE monitors every timer, and enables the port corresponding to a specific timer when the timer reaches a set time.

103: Detect whether a PD is connected to the power supply port. If a PD is connected to the power supply port, go to step 104; otherwise, return to step 101, namely, set the power supply port to the sleep state, and set the timer for the power supply port again.

Figure 2:
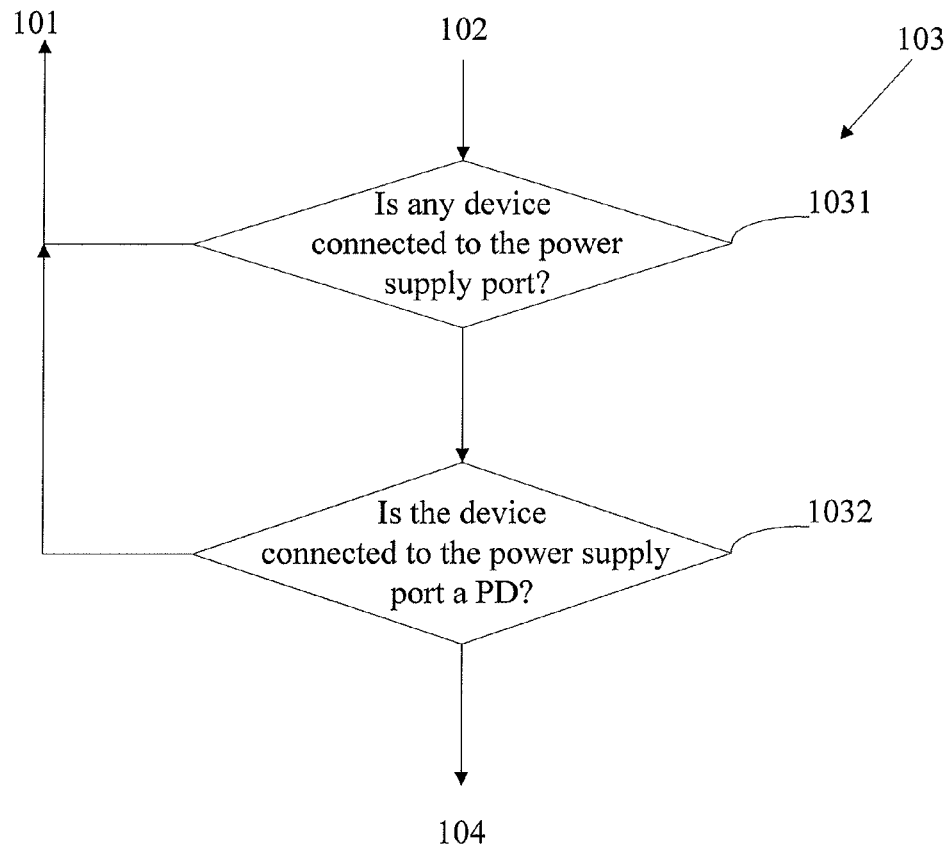
FIG. 2 is a schematic flowchart of detecting whether a PD is connected to a power supply port according to an embodiment of the present disclosure.

As shown in FIG. 2, step 103 may specifically include the following steps.

1031: Detect whether a device is connected to the power supply port. If no device is connected to the power supply port, return to step 101; otherwise, if a device is connected to the power supply port, go to step 1032.

Figure 3:
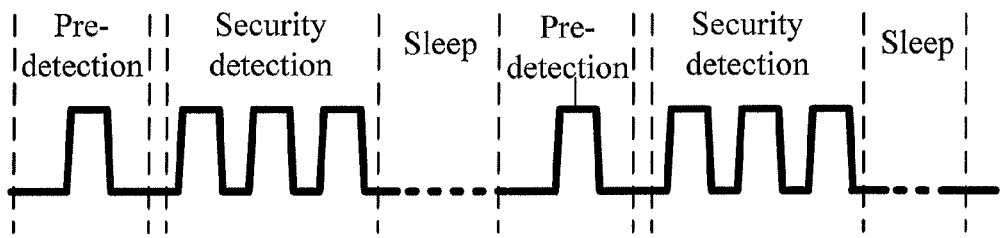
FIG. 3 is a schematic diagram of a voltage pulse sent from a power supply port according to an embodiment of the present disclosure.

The detection of whether a device is connected to the port is also known as pre-detection. Specifically, the control system of the PSE sends an instruction to the power supply port to cause the power supply port to send a pre-detection voltage pulse shown in FIG. 3, and judges, according to the current received by the power supply port, whether a device is connected to the power supply port.

1032: Detect whether the device connected to the power supply port is a PD. If the device is a PD, go to step 104; otherwise, return to step 101.

The detection of whether the device connected to the power supply port is a PD is also known as security detection. Specifically, the control system of the PSE sends an instruction to the power supply port to cause the power supply port to send multiple security detection voltage pulses shown in FIG. 3 continuously, and judges, according to the current received by the power supply port, whether a characteristic resistor specified in the standard is connected to the peer. If the characteristic resistor is connected to the peer, it is determined that the device connected to the power supply port is a PD.

104: Trigger the power supply port to supply power to the PD.

Specifically, the PSE supplies power to the PD through the power supply port.

While the power supply port supplies power to the PD, the control system of the PSE keeps detecting whether the PD is disconnected, and when finding that the PD is disconnected, triggers the power supply port to stop supplying power, resets the power supply port to the sleep state, and resets the timer for the power supply port.

In the method provided in the embodiment of the present disclosure, the power supply port gets into a sleep state when idle, and gets into an enabled state and supplies power to a PD when the PD is connected to the power supply port, which effectively reduces power consumption of the system and saves energy. Meanwhile, the detection is performed in steps, which prevents interference caused by incorrect line connections from being mistakenly regarded as connecting a PD to the power supply port, and improves precision of PD detection.

Figure 4:
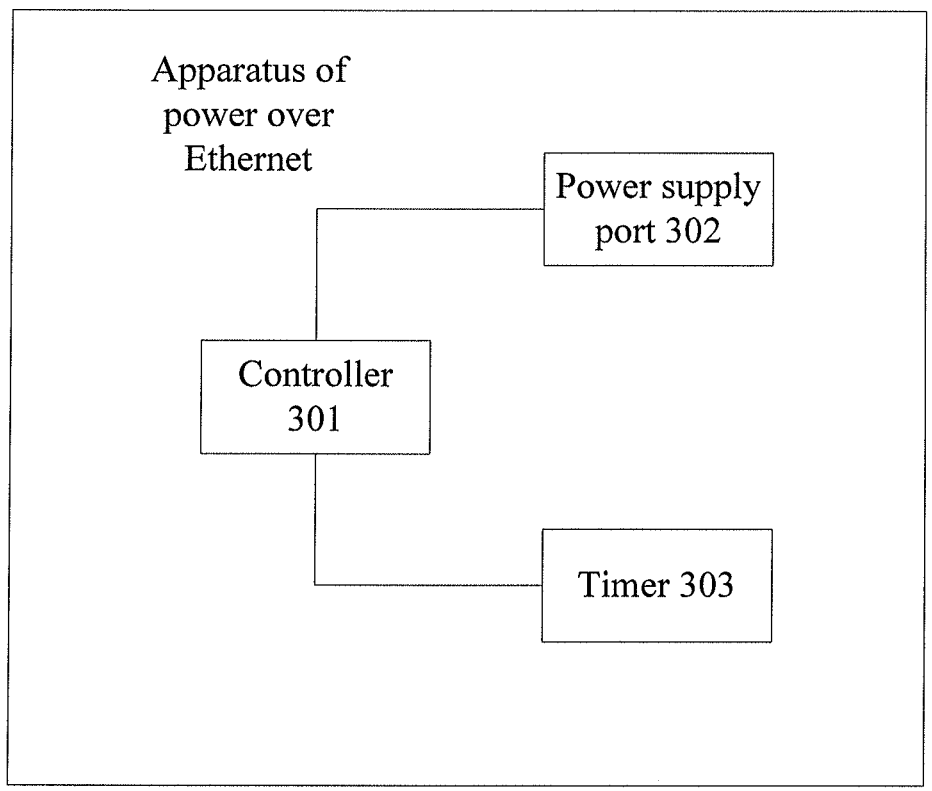
FIG. 4 is a schematic structural diagram of an apparatus of power over Ethernet according to an embodiment of the present disclosure.

An embodiment of the present disclosure further provides an apparatus of power over Ethernet to implement the foregoing method embodiment. As shown in FIG. 4, the apparatus of power over Ethernet includes a controller 301, a power supply port 302, and a timer 303.

The controller 301 is configured to: set the power supply port 302 to a sleep state, and set the timer 303 for the power supply port; enable the power supply port 302 when the timer 303 reaches a set time; and detect whether a PD is connected to the power supply port 302, and if it is detected that a PD is connected to the power supply port 302, trigger the power supply port to supply power to the PD; otherwise, set the power supply port 302 to the sleep state, and set the timer 303 for the power supply port 302 again.

The power supply port 302 is configured to supply power to the PD in an enabled state.

The timer 303 is configured to time the sleep state of the power supply port 302.

The controller 301 is specifically configured to: detect whether a device is connected to the power supply port 302, and if no device is connected to the power supply device 302, set the power supply port 302 to the sleep state, and set the timer 303 for the power supply port 302 again; if a device is connected to the power supply port 302, detect whether the device connected to the power supply port 302 is a PD, and if the device connected to the power supply port 302 is a PD, trigger the power supply port to supply power to the PD; if the device connected to the power supply port 302 is not a PD, set the power supply port 302 to the sleep state, and set the timer 303 for the power supply port 302 again.

The controller 301 is further configured to: while the power supply port 301 supplies power to the PD, detect whether the PD is disconnected, and when finding that the PD is disconnected, trigger the power supply port 302 to stop supplying power, reset the power supply port 302 to the sleep state, and reset the timer 303 for the power supply port 302.

Through the apparatus provided in the embodiment of the present disclosure, the power supply port gets into a sleep state when idle, and gets into an enabled state and supplies power to a PD when the PD is connected to the port, which effectively reduces power consumption of the system and saves energy. Meanwhile, the detection is performed in steps, which prevents interference caused by incorrect line connections from being mistakenly regarded as connecting a PD to the power supply port, and improves precision of PD detection.

Persons of ordinary skill in the art should understand that all or a part of the steps of the method according to the embodiments of the present disclosure may be implemented by a program instructing relevant hardware. The program may be stored in a computer readable storage medium. When the program runs, the program executes the steps of the method according to the embodiments of the present disclosure. The storage medium may be any medium capable of storing program codes, such as ROM, RAM, magnetic disk, or optical disk.

Finally, it should be noted that the above embodiments are merely provided for describing the technical solutions of the present disclosure, but not intended to limit the present disclosure. Although the present disclosure is described in detail with reference to the foregoing embodiments, it should be understood by persons of ordinary skill in the art that modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present disclosure.

What is claimed is:

1. A method of power over Ethernet, comprising:
setting a power supply port of a power sourcing equipment (PSE) to a sleep state, and setting a timer for the power supply port, wherein the PSE comprises a plurality of power supply ports, one timer is set for each power supply port; and in the sleep state, each power supply port of the PSE consumes no power;
enabling the power supply port when the timer reaches a set time; and
detecting whether a powered device (PD) is connected to the power supply port, and if a PD is connected to the power supply port, triggering the power supply port to supply power to the PD; if no PD is connected to the power supply port, setting the power supply port to the sleep state, and setting the timer for the power supply port again.

2. The method according to claim 1, wherein the detecting whether a PD is connected to the power supply port comprises:
   detecting whether a device is connected to the power supply port, and if no device is connected to the power supply port, setting the power supply port to the sleep state, and setting the timer for the power supply port again; if a device is connected to the power supply port, detecting whether the device connected to the power supply port is a PD.

3. The method according to claim 2, further comprising:
   while the power supply port supplies power to the PD, detecting whether the PD is disconnected, and when finding that the PD is disconnected, triggering the power supply port to stop supplying power, and setting the power supply port to the sleep state, and setting the timer for the power supply port again.

4. The method according to claim 1, further comprising:
   while the power supply port supplies power to the PD, detecting whether the PD is disconnected, and when finding that the PD is disconnected, triggering the power supply port to stop supplying power, and setting the power supply port to the sleep state, and setting the timer for the power supply port again.

5. An apparatus of power over Ethernet, comprising a controller, a power supply port, and a timer, wherein:
   the controller is configured to: set the power supply port to a sleep state, and set the timer for the power supply port; enable the power supply port when the timer reaches a set time; and detect whether a powered device (PD) is connected to the power supply port, and if a PD is connected to the power supply port, trigger the power supply port to supply power to the PD; if no PD is connected to the power supply port, set the power supply port to the sleep state, and set the timer for the power supply port again;
   the power supply port is configured to supply power to the PD in an enabled state; and
   the timer is configured to time the sleep state of the power supply port,
   wherein the apparatus comprises a plurality of power supply ports, one timer is set for each power supply port; and in the sleep state, each power supply port of the apparatus consumes no power.

6. The apparatus according to claim 5, wherein the controller is specifically configured to:
   detect whether a device is connected to the power supply port, and if no device is connected to the power supply port, set the power supply port to the sleep state, and set the timer for the power supply port again; if a device is connected to the power supply port, detect whether the device connected to the power supply port is a PD.

7. The apparatus according to claim 6, wherein the controller is further configured to:
   while the power supply port supplies power to the PD, detect whether the PD is disconnected, and when finding that the PD is disconnected, trigger the power supply port to stop supplying power, and set the power supply port to the sleep state, and set the timer for the power supply port again.

8. The apparatus according to claim 5, wherein the controller is further configured to:
   while the power supply port supplies power to the PD, detect whether the PD is disconnected, and when finding that the PD is disconnected, trigger the power supply port to stop supplying power, and set the power supply port to the sleep state, and set the timer for the power supply port again.

\* \* \* \* \*